United States Patent [19]
Neuner et al.

[11] 3,858,199
[45] Dec. 31, 1974

[54] TRACKING LEVEL DETECTOR

[75] Inventors: James A. Neuner, Gibsonia, Pa.; Maurizio Traversi, Torino, Italy

[73] Assignee: Westinghouse Electric Corporation, Pittsburgh, Pa.

[22] Filed: Jan. 3, 1973

[21] Appl. No.: 320,778

[52] U.S. Cl. ............ 340/347 AD, 307/235, 330/40, 340/347 DD
[51] Int. Cl. ............ H03k 13/00
[58] Field of Search ............ 328/137; 307/235, 204; 330/40; 340/347 DD, 347 AD; 235/155

[56] References Cited

UNITED STATES PATENTS

| | | | |
|---|---|---|---|
| 3,064,894 | 11/1962 | Campbell | 235/155 |
| 3,521,179 | 7/1970 | Blancke | 330/40 X |
| 3,593,285 | 7/1971 | Gillmann | 307/235 X |
| 3,596,107 | 7/1971 | Kittrell | 328/137 X |

OTHER PUBLICATIONS

Schulz "IBM Technical Disclosure Bulletin" Vol. 13, No. 10, March 1971, pp. 2941–2943.

*Primary Examiner*—Charles D. Miller
*Attorney, Agent, or Firm*—D. C. Abeles

[57] ABSTRACT

A tracking level detector is described capable of accommodating *n* analog inputs, where *n* is an integer ranging from one to infinity, to provide an analog output equal in magnitude and electrically buffered from one of the *n* inputs having the largest analog value (or lowest analog value according to the embodiment chosen), as compared to the remaining *n* - 1 inputs. The level detector is designed to exhibit a high input impedance at the *n* inputs to avoid loading the inputs and minimize the current drain. Additionally, a high differential and common mode input capability is established by providing a floating bias to the level detecting circuitry. Modified embodiments include an encoder which provides an additional digital coded output corresponding to the one of the n inputs controlling the analog output. Codes of various bit lengths are implementable. The characteristic advantages of the detector are obtained by utilitizing n operational amplifiers having their negative inputs connected in parallel and tied to the analog output at a common node point in parallel with a bias voltage supply.

1 Claim, 9 Drawing Figures

| HIGHEST ANALOG INPUT | BINARY OUTPUT A | B | C |
|---|---|---|---|
| 1 | 0 | 0 | 0 |
| 2 | 0 | 0 | 1 |
| 3 | 0 | 1 | 0 |
| 4 | 1 | 0 | 1 |
| 5 | 1 | 1 | 0 |
| m | 1 | 0 | 0 |

"1" = +$V_{CC}$ ; "0" = GROUND

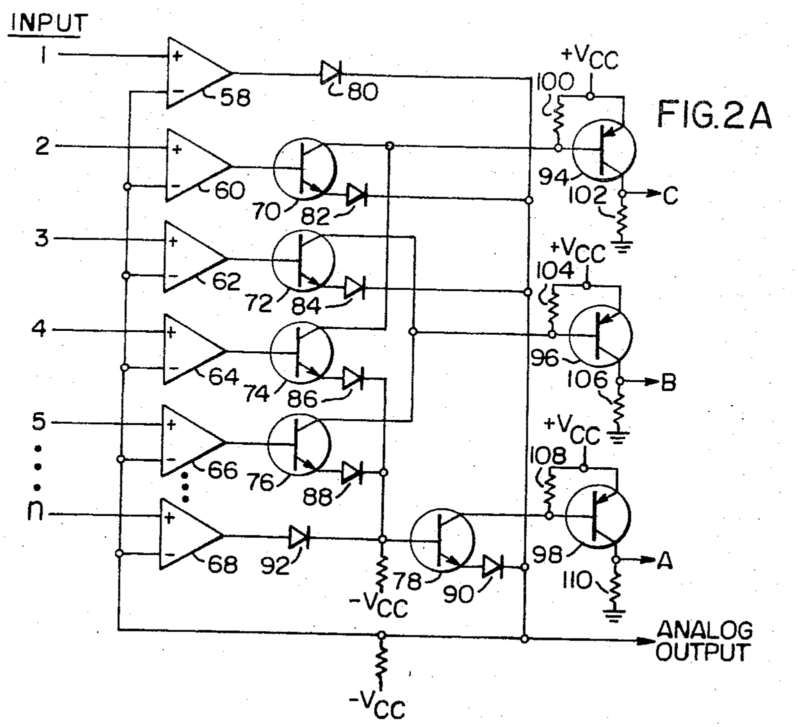
FIG.2A
| HIGHEST ANALOG INPUT | BINARY OUTPUT A | B | C |
|---|---|---|---|
| 1 | 0 | 0 | 0 |
| 2 | 0 | 0 | 1 |
| 3 | 0 | 1 | 0 |
| 4 | 1 | 0 | 1 |
| 5 | 1 | 1 | 0 |
| n | 1 | 0 | 0 |
| "1" = $+V_{CC}$ ; "0" = GROUND | | | |
FIG.2B
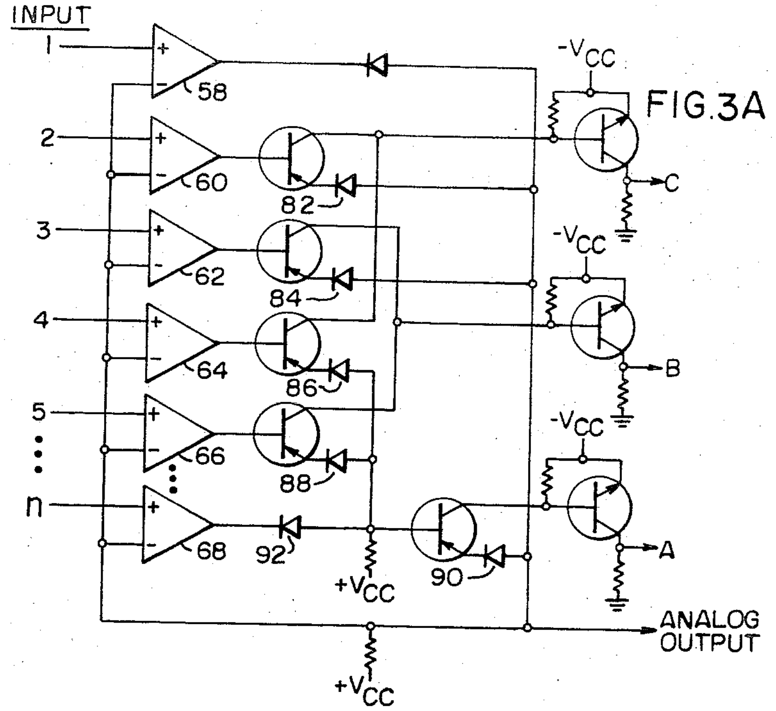
FIG.3A
| LOWEST ANALOG INPUT | BINARY OUTPUT A | B | C |
|---|---|---|---|
| 1 | 0 | 0 | 0 |
| 2 | 0 | 0 | 1 |
| 3 | 0 | 1 | 0 |
| 4 | 1 | 0 | 1 |
| 5 | 1 | 1 | 0 |
| n | 1 | 0 | 0 |
| "1" = $-V_{CC}$ ; 0 = GROUND | | | |
FIG.3B

TRACKING LEVEL DETECTOR

CROSS REFERENCE TO RELATED APPLICATION

The present invention is related to the invention covered by copending U.S. application (W. E. Case 44,067) Ser. No. 320,792 entitled "Digital Multiplex Position Indication System" by J. A. Neuner, F. T. Thompson and L. Vercellotti which is assigned to the assignee of the present invention and is filed concurrently herewith.

BACKGROUND OF THE INVENTION

This invention pertains in general to comparative electronic circuits and more particularly to tracking level detectors capable of comparing a multiplicity of analog inputs to provide an output equal in value to the largest analog input of a predetermined sign.

In many systems, it is desirable to compare a multiplicity of analog inputs in order to compute the largest of those inputs and transmit a replica thereof. Due to the relatively small voltages encountered in solid state circuits it is imperative to transmit an exact replica of the controlling input signal in order to avoid the loss of the information conveyed. One system requiring such a circuit is the digital multiplexed rod position indication system for nuclear reactors described in copending application Serial No. 320,776, (W. E. Case 43,906) entitled "Position Indication System" by F. T. Thompson. F. J. Young and D. J. Boomgaard which is assigned to the assignee of the present invention and filed concurrently herewith. The circuitry is required to determine the highest or lowest of n analog input signals, where *n* is an integer which can vary from one to infinity, and correspondingly control a number of digital outputs as a function of the highest or lowest analog signal as well as to have a buffered analog output equal to either the highest or lowest analog input signal. In addition, the analog input specifications of the comparative circuit must exhibit: a low bias current to avoid loading the analog inputs and minimize current drain; a low offset voltage so that the output analog signal is essentially an exact replica of the controlling analog input to avoid loss of the information conveyed as well as to accomplish an accurate comparison; and a large differential and common mode input capability so as to handle a large range of input amplitudes.

The primary disadvantage of the circuits presently available in the art for establishing the desired function is that commercially available components do not have the requisite specifications necessary to meet all of the aforementioned requirements. While components are available and capable of meeting several of the criteria set forth above, they are found to be expensive and difficult to duplicate to accommodate a multiplicity of inputs. Elaborate circuits utilizing an exhaustive number of elements for the purposes of compensation, have been devised but are expensive and still fail to produce a replicative analog output of the controlling input.

Accordingly, a simple circuit arrangement utilizing a minimum of standard inexpensive components is desired having the required low bias current, low offset voltage, and high differential and common mode input capability.

SUMMARY OF THE INVENTION

Briefly, the instant invention provides a tracking level detector capable of accommodating *n* analog inputs, where *n* is an integer ranging from 1 to infinity, to provide an analog output equal in magnitude and electrically buffered from the one of the *n* inputs having the largest analog value (or lowest analog value according to the embodiment chosen), as compared to the remaining *n* - 1 inputs. Negligible current drain is experienced by the respective *n* inputs due to the relatively high input impedance exhibited by the detector. A high differential and common mode input capability is established by providing a floating bias to the level detecting circuitry. Other embodiments include an encoder stage responsive to the one of the *n* inputs controlling the analog output to provide an additional binary coded putput corresponding to the controlling input. A number of digital codes of various bit lengths are implementable.

BRIEF DESCRIPTION OF THE DRAWINGS

For a better understanding of the invention, reference may be had to the preferred embodiment, exemplary of the invention, shown in the accompanying drawings, in which:

FIG. 2A is a schematic circuitry diagram of one embodiment of this invention for determining the largest analog input;

FIG. 2B is the truth table corresponding to FIG. 2A;

FIG. 3A is a schematic circuitry diagram of a modification to the circuit of FIG. 2A for determining the lowest analog input;

FIG. 3B is a truth table corresponding to the circuit of FIG. 3A;

DESCRIPTION OF THE PREFERRED EMBODIMENT

The circuit contemplated by this invention, generally known as a tracking level detector, has the capability of accommodating and being responsive to *n* analog inputs, where *n* is an integer which can range from 1 to infinity, to provide an analog output equal in magnitude and electrically buffered from the one of the *n* inputs having the maximum value, of a predetermined sign, as compared to the remaining *n* -1 inputs. A predetermined sign within the context of this specification should be understood to mean either the maximum high or low input voltage as compared to the ohter inputs, not necessarily being dependent upon the positive or negative character of that voltage. In its preferred form an additional coded digital output is provided corresponding to the highest or lowest controlling analog input signal as determined by the design. The primary advantage provided by the circuitry of this invention is the capability of accommodating an unlimited combination of a large number of inputs, while exhibiting a high input impedance, low offset voltage, and high differential and common mode input capability. Furthermore, the implementation of various output codes obtained by means of inexpensive, commercially available components is described.

Figures 1A, 1B:
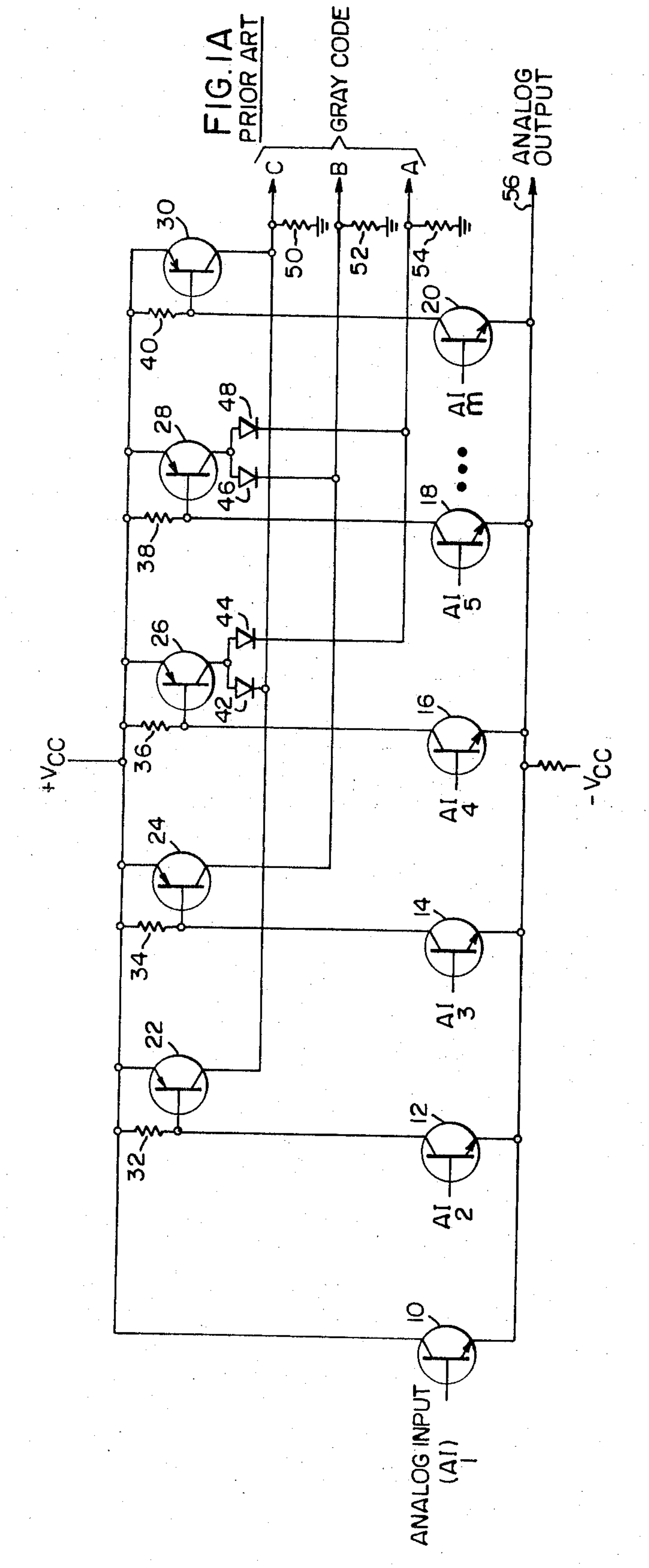
FIG. 1A is a schematic diagram exemplary of prior art arrangements.
FIG. 1B is a truth table corresponding to the circuit of FIG. 1A.

In the past, the simplest and possibly the most standard method of implementing the desired function described was to use separate differential amplifiers, level translators and encoder stages similar to those illustrated in FIG. 1A. FIG. 1A is considered exemplary of such prior art circuits and incorporates a differential amplifier which is composed of transistors 10 through 20 and resistors 32 through 40. The level translator is composed of transistors 22 through 30 and the encoder is composed of diodes 42 through 48, resistors 50 through 54, and the appropriate wire-ORed connections of the collectors of transistors 22 through 30. Obviously, the highest analog input controls the differential amplifier causing conduction of the corresponding level translator and the resulting binary output ABC. The analog output tracks the highest analog input but has an inherent error of one base-emitter drop. Similarly, a circuit could be constructed controlled by the lowest of all the analog input signals.

The primary disadvantage of the circuit shown in FIG. 1A is that commercially available components do not have the specifications necessary to meet all of the requirements of the aforedescribed function. Even those components capable of meeting only several of the requirements are found to be expensive. For example, to achieve the low bias current, transistors 10 through 20 would have to have a very high gain with the attendant expense usually associated with high gain transistors. A second disadvantage is that the differential input voltage capability of the circuit is limited by the base-emitter breakdown voltage, usually 5 to 7 volts, which limits the various voltage inputs the circuit can accommodate. Similarly, in order to accommodate a high common mode input capability, where the inputs are required to swing over a relatively large voltage range, transistors 10 through 20 would have to be high voltage, low current transistors; to minimize input current drain, transistors 10 through 20 would have to be high voltage, low current transistors with high gain; to minimize input offset voltage, transistors 10 through 20 would have to be well matched by being fabricated simultaneously on one monolithic integrated circuit. If the number of analog inputs is limited to five or six, components are available to meet most but not all of the above requirements. However, if, as in a control rod position indication system, the number of analog inputs is large, for example greater than 20, then no standard component can be found to meet all of the requirements.

FIG. 1B is the truth table for the circuit of FIG. 1A illustrating the corresponding binary outputs ABC provided when the various analog inputs 1 through M respectively control, and is shown as an aid in understanding the operation of the circuit of FIG. 1A.

A circuit contemplated by this invention for accomplishing the desired function, utilizing standard inexpensive commercially available components and having the required low bias current, low offset voltage, and high differential input capability is shown in FIG. 2A. The circuit illustrated in FIG. 2A is designed to track the highest input signal and can be compared with the circuit shown in FIG. 3A which employs similar construction to track the lowest input signal. The basic component employed is an operational amplifier, such as a 747 operational amplifier, which is utilized for its latch-up proof operation and low cost. The operation of the circuit of FIG. 2A is described in the following paragraph, however, it should be kept in mind that the description applies in an analogous manner to the circuit of FIG. 3A with the output being controlled by the input having the lowest analog value a any given point in time.

As an explanational aid in understanding the circuit of FIG. 2A, assume input 2 has the highest analog value of all the inputs. The output of amplifier 60 will then rise sufficiently to forward bias the base-emitter junction of transistor 70 and diode 82 in order to make the signal fed back to the inverting input of amplifier 60 equal to the voltage at input 2. This same voltage is fed back through all the inverting inputs of each of the amplifiers 58 through 68 and inasmuch as all other inputs are less than input 2, all the remaining amplifiers, 58, 62, 64, 66 and 68 will be saturated negative. Since transistor 70 is conducting, transistor 94 will be on, establishing a binary output at A B C equal to 001. If input 4 is assumed the highest of all inputs, transistors 74 and 78 (the transistor normally controlled by input *n*) will both be conducting establishing the binary output code 101. Consequently the encoding stage is included within the tracking level detector by the interconnection of transistors 70 through 78 within the feedback loop of the operational amplifiers and by the appropriate wire OR-ing of collectors. Since the transistors are included within the feedback loop, the circuit's input impedance and offset voltage are determined only by the operational amplifier chosen. Transistors 94 through 98 and resistors 100 through 110 serve as level translators to change the current output to a voltage signal. Inasmuch as the analog output signal is also the signal fed back to the inverting inputs of all the amplifiers, the circuit will track the highest input signal and provide an analog output which differs from the controlling input by the offset voltage of the operational amplifier. As is known in the art, this offset voltage can be nulled to zero by the incorporation of a trim pot within the amplifier circuit. The truth table provided in FIG. 2B is self-explanatory of the operation of the circuit of FIG. 2A identifying the corresponding outputs obtained when each of the inputs 1 through *n* respectively control. A similar process occurs during the operation of the circuit illustrated in FIG. 3A with the corresponding truth table being shown in FIG. 3B. In both configurations, the respective diodes 82, 84, 86, 88 and 90 are placed in series with the emitter-base junctions of the corresponding follower transistors to prevent breakdown of the respective junctions. Furthermore, the number of outputs required to carry the binary coded signal in both circuits is equal to X; where $2^X$ equals *n*; and where *n* is the number of inputs.

Figure 4:
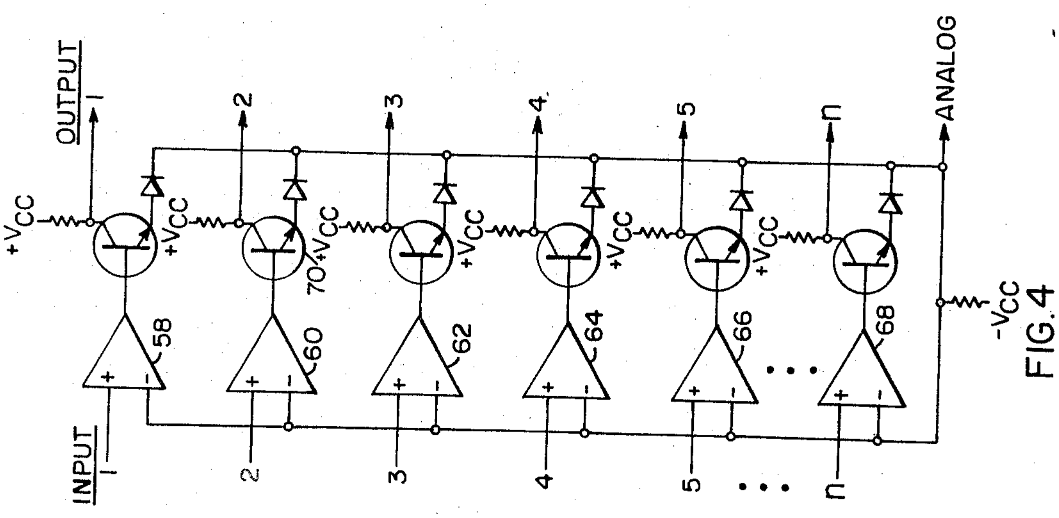
FIG. 4 is a schematic circuitry diagram of a simplified modification of the circuit of FIG. 2A.

A simplification of the circuit illustrated in FIG. 2A is shown in FIG. 4 for applications not requiring a minimum number of coded outputs. In this modification, each input stage is similarly constructed to include an amplifier, transistor, and diode, i.e., electrical components 60, 70 and 82 respectively. The operation is similar to that of an *n* input differential amplifier having the characteristics required by the criterion of this invention. It should be appreciated however, that the output code will require a number of output terminals equal to the number of analog inputs. The disadvantage engendered by the attendant increase in the number of wires required will be offset in many applications by the advantages supplied by standardization of the input stages. The operation of the circuit of FIG. 4 follows directly from the operational description provided for the circuit of FIG. 2A. Similarly, a circuit capable of tracking the lowest analog input can be constructed analogous to the circuit of FIG. 3B.

Figure 5:
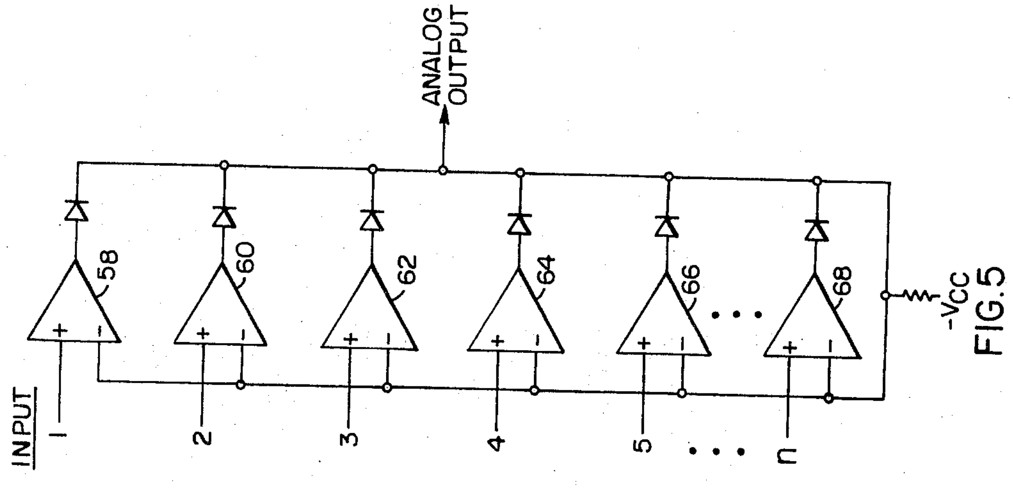
FIG. 5 is a schematic circuitry diagram of a simplified modification of the circuit of FIG. 4.

A further simplification is illustrated in FIG. 5 for applications not requiring a coded output. The operation of the circuit of FIG. 5 is self-explanatory and provides a single analog output which is equal in magnitude and buffered from the highest input signal. Again, a number of operational amplifiers 58 through 68 are provided with the inverted inputs coupled in parallel and tied to the wire OR-ed arrangement of the amplifier output diodes connected at a common node point in parallel with a bias voltage supply. To construct a circuit that will track the lowest analog signal it is only necessary to reverse the direction of the respective diodes and provide a bias voltage supply equal and opposite in sign to the supply indicated by reference character $V_{CC}$.

Figure 6:
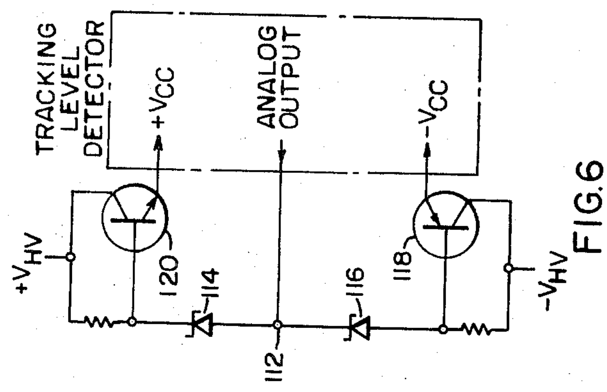
FIG. 6 is an accessorial modification to the circuits previously illustrated for accommodating high common mode and differential inputs.

By employing the additional circuitry illustrated in FIG. 6, the tracking level detector can accommodate high common mode input signals in the order of magnitude of the voltages indicated by $V_{HV}$. It should be noted that although it is not shown in the corresponding figures, each of the operational amplifiers inherently require a positive and negative supply voltage bias, $+V_{CC}$ and $-V_{CC}$, which also corresponds to the bias voltage $V_{CC}$ indicated at the common node point coupling the analog output to the amplifiers' negative input. The high common mode input capability is accomplished by floating the tracking level detector circuitry between the plus and minus high voltage supplies $V_{HV}$ and utilizing the analog output to control the exact voltage. Accordingly, the analog output terminal of the various circuits are connected to node 112 between Zener diodes 114 and 116 and the plus and minus bias voltage supplies $V_{CC}$ are connected respectively to the corresponding emitters of transistors 120 and 118. Thus all of the important parameters previously described such as bias current, offset voltage, and differential input capability are determined solely by the operational amplifier chosen. All other elements of the circuits can be contructed from low grade, economical and readily available commercial components. Consequently, the circuit is expandible to an unlimited number of inputs *n*. The analog output signal is a low impedance output that tracks exactly with the highest or lowest input signal according to the circuit configuration chosen. Encoding is included within the tracking level detector stage without a degradation of the vital input parameters which might otherwise result from a high bias current drain on the various inputs. Additionally, the circuit can be altered as described to accommodate high common mode inputs.

While in the prior art, the input impedance was generally controlled by beta (the current transfer ratio of the transistors employed), in the cicuits contemplated by this invention the input impedance is controlled by the bias current of the operational amplifier which is the current drawn at the respective inputs. A relationship can be established between the base current input responsible for this current drain in the prior art devices and the bias current of the operational amplifiers employed in the circuit of this invention. The bias current corresponds to the base current which equals the collector current divided by beta. Utilizing optimum commercial components presently available, bias current specifications in the order of $10^{-11}$ amperes are obtainable, while the optimum specifications for transistors presently available require base currents in the order of $10^{-6}$ amperes. Accordingly, the advantage of the circuitry of the present invention in providing a relatively high input impedance as compared to the prior art is evidenced in the reduction in loading exhibited on the analog input circuitry.

Furthermore, where an accurate comparison of inputs is required, the circuitry contemplated by this invention exhibits a differential offset voltage which can be nulled to zero while the prior art offset voltage is determined by the voltage drop across the base-emitter junction which cannot be nulled out. Accordingly, the circuitry of the instant invention provides an exact replacative analog output which tracks the analog input, while the prior art provides an analog output which differs in the order of magnitude of the voltage across the base-emitter junction. As previously mentioned, though this voltage drop may appear to be small, in comparison to the voltages employed with solid state elements, this differential can cause a loss of the information intended to be conveyed at the output. Additionally, the differential voltage appearing across corresponding inputs are no longer limited, as they were in the prior art, to the base-emitter junction break down voltage of the input transistors, but can now span ranges in the order of magnitude of the supply voltages, increasing the differential mode input capability of the detector.

Additionally, the instant invention provides a reduction in circuitry in that, as provided in FIG. 2, one level translator is required per digital bit output as compared to the prior art circuits which required a level translator per input.

Accordingly, the circuitry contemplated by this invention provides an optimum unit for comparing a multitude of inputs to discern and reproduce an electrically buffered analog output corresponding to the highest input of a predetermined sign, with a second digital coded output identifying which one of the multiplicity of inputs controls. The derived function is not only performed with theoretical accuracy but it accomplished with a minimum of parts without providing an appreciable load on the input circuitry.

We claim as our invention:

1. A tracking detector comprising means for comparing the level of *n* analog electrical inputs, where *n* is an integer from one to infinity, and responsive to one of said *n* inputs having an extreme analog value of predetermined sign at any given point in time as compared to the remaining *n* - 1 inputs to provide an analog output electrically buffered from and equal to said one input having the extreme value including:

*n* operational amplifiers having a first non-inverting input and a second inverting input and an output, each of said inverting inputs being connected in parallel to said analog output and each of said non-inverting inputs being connected to corresponding ones of said *n* inputs;

*n* diodes respectively connected in series with corresponding ones of said *n* operational amplifier outputs in a direction to pass the output in accordance with the predetermined sign, each of said diodes being wire OR-ed to said analog output so as to form a feedback loop between the corresponding inverting inputs and outputs of the respective operational amplifiers;

bias reference voltage means connected at said analog output having a predetermined floating voltage value to bias said n operational amplifiers to pass said one of said n inputs having the extreme value to said analog output so as to accommodate high common mode input voltages on said *n* inputs in the order of magnitude of said bias voltage; and an encoder electrically connected as a part of said feedback loop to said *n* operational amplifiers and responsive to said one of said *n* inputs having the extreme analog value to provide a digital coded output corresponding thereto having *x* bits where $2^x$ equals *n*.

* * * * *